208-120. AL 115 FX
2-18-75 52-341

United States Patent

Re. 28,341
Reissued Feb. 18, 1975

28,341

CATALYTIC COMPOSITION OF A CRYSTALLINE ZEOLITE

Robert L. Wadlinger, Niagara, N.Y., and George T. Kerr, Trenton, and Edward J. Rosinski, Deptford, N.J., assignors to Mobil Oil Corporation No Drawing. Original No. 3,308,069, dated Mar. 7, 1967, Ser. No. 364,316, May 1, 1964. Application for reissue Mar. 4, 1969, Ser. No. 806,753
Int. Cl. B01j *11/40;* C10g *11/04*
U.S. Cl. 208—120 17 Claims

Matter enclosed in heavy brackets [ ] appears in the original patent but forms no part of this reissue specification; matter printed in italics indicates the additions made by reissue.

ABSTRACT OF THE DISCLOSURE

*This invention relates to a new catalyst, zeolite beta, $[XNa(1.0\pm0.1-X)TEA]AlO_2.YSiO_2.WH_2O$ wherein X is less than 1, Y is greater than 5 but less than 100, W is up to about 4, and TEA represents tetraethylammonium ion, its process of manufacture, and its use in calcined form in catalytic hydrocarbon conversion processes.*

This invention relates to a new synthetic zeolite and to a method for preparing the same. The invention also is concerned with a catalytic composition comprising said zeolite and with catalytic conversion in the presence thereof.

Crystalline aluminosilicate zeolite structurally consist basically of an open three-dimensional framework of $SiO_4$ and $AlO_4$ tetrahedra. Such tetrahedra are cross-linked by the sharing of oxygen atoms, so that the ratio of oxygen atoms to the total of the aluminum and silicon atoms is equal to two. The negative electrovalence of tetrahedra containing aluminum is balanced by the inclusion within the crystal of cations, such as alkali or alkaline earth metal ions.

Many zeolites possess a crystal structure, having channels of molecular dimensions. The interstitial spaces are generally originally occupied by water of hydration. After at least partial dehydration, these zeolites may be utilized as efficient adsorbents whereby adsorbate molecules are retained within the interstitial spaces. The interstitial dimensions of openings in the crystal lattice limit the size and shape of the molecules that can be adsorbed. A separation of a mixture of various molecules, based upon molecular dimensions, wherein certain molecules are adsorbed by the zeolite while others are excluded from admission is therefore possible. It is such characteristic of many crystalline zeolites that has led to their designation as molecular sieves.

A number of synthetic crystalline zeolites have previously been prepared. They are distinguishable from each other and from naturally occurring zeolites on the basis of composition, crystal structure and adsorption properties. The existence of a number of zeolites having similar but distinguishable properties advantageously permits the selection of a particular member having optimum properties for a particular use.

Thus it has heretofore been known to prepare a synthetic zeolite known as "zeolite A." Such material and preparation thereof has been described in U.S. 2,882,243. This zeolite is initially obtained in its sodium form, i.e. as a sodium aluminosilicate. Such material is capable of effectively sorbing water and straight chain compounds of three or less carbon atoms such as methane, ethane, n-propane, methanol, ethanol, n-propanol and the like. Sodium zeolite A, however, is incapable of adsorbing, to an appreciable extent, straight chain compounds having more than three atoms in the chain. Thus, it is only after replacement, by ion exchange, of a substantial proportion of the sodium ions of the initially obtained sodium zeolite A with divalent ions, such as calcium or magnesium that the pore characteristics thereof are such as to effect separation of straight chain hydrocarbons of more than 3 carbon atoms from admixture with branch chain or cyclic compounds. Sodium zeolite A, known commercially as molecular sieve 4A, is thus incapable of admitting into its crystalline structure molecules for which the maximum dimension of the minimum projected cross-section is greater than about 4.9 Angstroms. In order to produce a zeolite A capable of effecting separation of mixtures of straight chain and branched chain molecules or for separation of straight chain molecules from cyclic compounds having four or more atoms, it has heretofore been necessary to first carry out exchange of the initially obtained sodium zeolite A with another ion, such as calcium or magnesium, and to thereby effect exchange of the sodium ion to the extent of at least about 40 percent with such substituting ion. The resulting product, in which calcium is the introduced ion, is known commercially as molecular sieve 5A. This zeolite has larger pore dimensions than does the 4A sieve and permits adsorption of molecules for which the maximum dimension of the minimum projected cross-section is about 5.5 Angstroms.

It has also been known prior to the present invention to synthesize a zeolite, known as zeolie ZK–4, more particularly described in co-pending application Serial No. 134,841, filed August 30, 1961. This zeolite, which essentially in its sodium form, i.e., the form in which the zeolite is obtained from the preparative reaction mixtures, is capable of accomplishing separation of straight chain molecules having more than three atoms in the chain from non-straight chain, i.e. from branched chain and/or cyclic, molecules of more than three atoms without the necessity of converting such form zeolite into another ionic form by prior base-exchange such as has heretofore been necessary in achieving a synthetic zeolite of the above requisite pore characteristics.

The composition of zeolite ZK–4 can stoichiometrically be expressed, in terms of mole ratios of oxides as follows:

$$0.1 \text{ to } 0.3R:0.7 \text{ to } 1.0M_{2/n}O:1Al_2O_3:2.5 \text{ to } 4.0SiO_2\cdot YH_2O$$

where R is selected from the group consisting of a methyl ammonium oxide, hydrogen oxide and mixtures thereof with one another; M is a metal and n is the valence thereof and Y is any value from about 3.5 to about 5.5, said material being capable of selectively sorbing straight chain hydrocarbons of more than three carbon atoms from admixture of the same with non-straight chain hydrocarbons when M is sodium and capable of selectively sorbing water from admixture of the same with straight chain molecules having more than three atoms in the chain when M is potassium. Minor variations in the mole ratios of these oxides within the range indicated by the above formula do not significantly change the crystal structure or physical properties of the zeolite.

It has also been known prior to the present invention to synthesize a zeolite, known as zeolite alpha, more particularly described in co-pending application Ser. No. 237,289 filed November 13, 1962. This zeolite alpha has an A-type lattice and a silicon to aluminum content greater than that of zeolite ZK–4.

The composition of zeolite alpha can stoichiometrically be expressed, in terms of mole ratios of oxides as follows:

$$0.2 \text{ to } 0.5R_{2/m}O: 0.5 \text{ to } 0.8M_{2/m}O: 1Al_2O_3:>4.0 \text{ to } 7.0SiO_2\cdot YH_2O$$

where R represents ions selected from those of the group consisting of metal, methyl ammonium, hydrogen and mixtures thereof with one another; m is the valence of R; M represents ions selected from those of the group consisting of hydrogen, metal and hydrogen-metal mixtures, n is the valence of M, and Y is any value up to about 8.0, said material being further characterized by the ability to selectively sorb straight chain hydrocarbons of more than three carbon atoms from admixture of the same with non-straight chain hydrocarbons when M is sodium and by an A type lattice as determined by X-ray diffraction.

In accordance with the present invention, there is provided a new zeolite having a novel structure as defined by X-ray crystallography and which has a novel combination of adsorption properties. This new zeolite will hereinafter be referred to as "zeolite beta."

The present invention is directed to a crystalline synthetic material where composition has been calculated to be:

$$[XNa(1.0\pm0.1-X)TEA]AlO_2\cdot YSiO_2\cdot WH_2O$$

where X is less than 1, preferably less than 0.75; TEA represents tetraethylammonium ion; Y is greater than 5 but less than 100 and W is up to about 4 depending on the condition of dehydration and on the metal cation present. The TEA component is calculated by difference from the analyzed value of sodium and the ultimate theoretical cation of Al ratio of 1.0/1.

In another embodiment, the invention provides for a crystalline synthetic material which has catalytic properties having the composition:

$$\left[\frac{X}{n}N(1\pm0.1-X)H\right]AlO_2\cdot YSiO_2\cdot WH_2O$$

where X, Y and W have the values listed above and n is the valence of the metal M which can be any metal, preferably a metal of groups 1a, 2a, 3a or one of the transition metals or mixtures thereof as shown in the Mendeléeff periodic chart.

In still another embodiment, the invention provides for a crystalline synthetic material which has catalytic properties having the compositions:

$$\left[\frac{X}{n}M(1\pm0.1-X)TEA\right]AlO_2\cdot YSiO_2\cdot WH_2O\ n$$

where X, Y, W, n and M have the values listed above. This form of the catalyst is obtained from the initial sodium form of zeolite beta by ion exchange without calcining.

Thus, the zeolite beta is formed by crystallization from a reaction mixture containing the tetraethylammonium ion. Upon heating of the product, at a temperature in the approximate range of 400–1700° F. or higher, the tetraethylammonium ion undergoes degradation to the hydrogen ion. Further, in this case the value of W in the formula may be essentially 0.

It is a particular feature of the present invention, that zeolite beta is prepared from reaction mixtures containing tetraethylammonium hydroxide as the alkali and more specifically by heating in aqueous solution a mixture of the oxides or of materials whose chemical compositions can be completely represented as mixtures of the oxides $Na_2O$, $Al_2O_3$, $[(C_2H_5)_4N]_2O$, $SiO_2$ and $H_2O$ suitably at a temperature of about 75° C. to 200° C. until crystallization occurs. The composition of the reaction mixture, expressed in terms of mol ratios, preferably falls within the following ranges:

$SiO_2/Al_2O_3$—from about 10 to about 200
$Na_2O$/tetraethylammonium hydroxide (TEAOH)—from about 0.0 to 0.1
TEAOH/$SiO_2$—from about 0.1 to about 1.0
$H_2O$/TEAOH—from about 20 to about 75

The product which crystallizes from the hot reaction mixture is separated, suitably by centrifuging or filtration, washed with water and dried. The material so obtained may be calcined by heating in air or an inert atmosphere at a temperature in the approximate range of 400–1700° F. or higher so long as the temperature is not sufficient to destroy the crystallinity.

In making zeolite beta, the method comprises reacting in aqueous media, amorphous silica solids or sols and a soluble aluminate along with aqueous solutions of tetraethylammonium hydroxide. The aluminate may be sodium aluminate or tetraethylammonium aluminate. Amorphous silica-alumina solids may be used as the source of the silica and alumina. The reaction mixture is initially continuously or periodically stirred to insure homogeneity. After this mixing, agitation may be stopped as it is unnecessary to agitate the reaction mass during the formation and crystallization of the zeolite, although mixing during such latter stages has not been found to be detrimental.

The crystallization procedures can be satisfactorily carried out at temperatures within the range from about 75° C. to about 200° C. The pressure during crystallization is atmospheric or at least that which corresponds to the vapor pressure of water in equilibrium with the mixture of reactants. Heating is continued until desired crystalline zeolite product is formed. The zeolite crystals are then separated from the mother liquor and washed, preferably with distilled water.

In the synthesis of zeolite beta, it has been found that the composition of the reaction mixture is critical. Specifically, the presence of tetraethylammonium ions in such mixture has been found to be essential for the production of zeolite beta.

In the absence of such ions or even in the presence of quaternary ammonium ions other than tetraethyl, no zeolite beta was obtained.

Because of the use of tetraethylammonium hydroxide in its preparation, zeolite beta may contain occluded tetraethylammonium ions (e.g., as the hydroxide or silicate) within its pores in addition to that required by electro neutrality and indicated in the calculated formulas given heretofore. For example, there was found an additional 1.3 equivalent of tetraethylammonium ion in one preparation of zeolite beta beyond that required by the formulas given above. The formulas, of course, are calculated using the knowledge of all zeolite chemistry that one equivalent of cation is required per Al atom in tetrahedral coordination in the crystal lattice.

Sodium oxide present in the reaction mixture may be derived from sodium aluminate or an amorphous sodium aluminosilicate gel. The latter is characterized by the following composition:

$$Na(AlO_2\cdot XSiO_2)$$

where X is a number in the approximate range of 0.5–20. This material may be prepared by reaction of ethyl orthosilicate and sodium aluminate. Another suitable source of alumina and sodium oxide is a solution of aluminum turnings in an alkali. Tetraethylammonium aluminates can also be used. Silica present in the reaction mixture may be derived from a variety of sources, for example, silica gel, silica hydrosol, and silicate esters.

Zeolite beta is different from any other known crystalline aluminosilicates in several ways. First of all, it has a novel structure as defined by X-ray crystallography. Some d-spacings of the crystal and their relative intensities as defined by X-ray powder pictures are given in Table 2 hereafter.

Secondly, zeolite beta has a novel combination of adsorption properties. The adsorptive capacities for cyclohexane, n-hexane and $H_2O$ are approximately equal, or of the same order of magnitude. This is the first zeolite known to the inventors in which the $H_2O$ adsorption capacity does not substantially exceed the cyclohexane adsorption. Further, the $SiO_2/Al_2O_3$ ratio is extremely high and extremely variable, going from 10 to 100 and possibly as high as 150.

The following Table 1 summarizes the differences in water and cyclohexane adsorption for various zeolites:

TABLE 1

| Zeolite | Molar chemical composition | | | Sorption capacity in grams sorbed/100 g. of activated sample | | |
|---|---|---|---|---|---|---|
| | $Na_2O$ | $Al_2O_3$ | $SiO_2$ | Cyclohexane | n-Hexane | $H_2O$ |
| Zeolite A | 1.0 | 1.0 | 2.0 | <1 | <1 | 24 |
| Zeolite ZK-4 | 0.8 | 1.0 | 3.5 | <1 | 13 | 26 |
| Zeolite Alpha | 0.6 | 1.0 | 6.0 | 2 | 17 | 30 |
| Zeolite Beta (Example 2) | 0.54 | 1.00 | 75.5 | 19.4 | 16.6 | 18.1 |

Catalytic materials can be prepared by calcining the original sodium form of zeolite beta and/or by replacing the major portion of the sodium in the zeolite with other metallic and/or ammoniacal ions. If the calcination is carried out prior to ion exchange, some or all of the resulting hydrogen ions can be replaced by metal ions in the ion exchange process. For certain dehydrogenation and hydrogenation reactions such as hydrocracking the catalyst will preferably contain a metal of Groups 5b, 6b or 8 of the Periodic Table and such metal may either be in the cation of the zeolite or deposited on the surface of the zeolite when the later is characterized by a cracking activity. Thus, a Zeolite beta catalyst having a metal therein of Groups 1a, 2a, 3a or one of the transition metals may have deposited thereon a metal of Groups 5b, 6b or 8 of the Periodic Table.

Zeolite beta may be used as an adsorbent in any suitable form. For example, a column of powder crystalline material may afford excellent results as may a pelleted form obtained by pressing into pellets a mixture of zeolite beta and a suitable bonding agent, such as clay.

The compositions contemplated herein include not only the sodium form of zeolite beta as synthesized from a sodium-aluminum-silicate-tetraethylammonium-water system with sodium as the exchangeable cation but also crystalline materials obtained from such a zeolite by partial or complete replacement of the sodium ion with other cations. The sodium cations can be replaced, at least in part, by other ions including those of metals below sodium in the electromotive series, calcium, ammonium, hydrogen and combinations of such ions with one another. Particularly preferred for such purpose are the alkaline earth metal ions; Group 2 metal ions, ions of the transition metals such as manganese and nickel, the rare earth metals such as cerium, lanthanum, praseodyminum, neodymium, samarium and mixtures thereof with each other and the other rare earth; and other ions, for example, hydrogen and ammonium which behave in zeolite beta as metals in that they can replace metal ions without causing any appreciable change in the basic structure of the zeolite crystal. The transition metals are those whose atomic numbers are from 21 to 28, from 39 to 46 and from 72 to 78 inclusive, namely scandium, titanium, vanadium, chromium, managese, iron, cobalt, nickel, yttrium, zirconium, niobium, molybdenum, ruthenium, rhodium, palladium, platinum, hafnium, tantalum, tungsten, rhenium, osmium and iridium.

Ion exchange of the sodium form of zeolite beta may be accomplished by conventional methods. A preferred continuous method is to pack zeolite beta into a series of vertical columns and successively pass through the beds a water solution of a soluble salt of the cation to be introduced into the zeolite; and change the flow from the first bed to the second bed as the zeolite in the first bed becomes ion exchanged to the desired extent. The spatial arrangement of the aluminum, silicon and oxygen atoms which make up the basic crystal lattice of the zeolite remains essentially unchanged by partial or complete substitution of the sodium ion by other cations.

In identification of zeolites, the X-ray powder diffraction pattern has been found useful. X-ray diffraction powder patterns of zeolite beta were obtained utilizing standard techniques. The radiation was the K alpha doublet of copper and a Geiger counter spectrometer with a strip chart pen recorder was used. The peak heights, I, and the positions as a function of $2\phi$, where $\phi$ is the Bragg angle, were read from the spectrometer chart. d (obs), the interplanar spacing in A, corresponding to the recorded lines were calculated. The cell constant for zeolite beta, i.e., the dimension of the edge of the cubic until cell was determined as 12.04 A.±0.14 A. X-ray powder diffraction data for typical zeolite beta samples are set forth in Table 2 hereinbelow.

The appearance of few minor lines and the disappearance of other lines can be attributed to compositional differences in silicon to aluminum ratios in the sodium form beta zeolites summarized in Table 2. In Table 3 the variation in intensities, and appearance and disappearance of some lines can be attributed to cation exchange.

Example A in Table 2 was dried at 212° F.; Examples B and C at 230° F. and Example D calcined ten hours at 1000° F. in air.

TABLE 2.—SODIUM ZEOLITE BETA

| A | | B | | C | | D | |
|---|---|---|---|---|---|---|---|
| d (A.) | Int. | d (A.) | Int. | d (A.) | Int. | d (A.) | Int. |
| 14.3 | MW | | | | | | |
| 11.5 | S | 11.5 | S | 11.8 | S | 11.55 | S |
| | | | | 10.1 | MW | | |
| 7.56 | | 7.56 | W | 1.59 | W | 7.5 | MW |
| 7.44 | VW | | | | | | |
| 6.97 | | 6.97 | VW | 7.15 | W | | |
| 6.86 | MW | | | | | | |
| 6.615 | | 6.615 | VW | | | | |
| 6.59 | | | | 6.54 | W | 6.59 | MW |
| 6.165 | VW | | | | | | |
| 6.10 | | 6.10 | VW | | | 6.14 | VW |
| 6.04 | | | | 6.02 | W | 6.04 | VW |
| 5.64 | M | | | | | | |
| 5.51 | W | | | | | | |
| 5.36 | | 5.36 | VW | | | | |
| 5.29 | | | | | | | |
| 5.00 | MW | | | | | | |
| 4.91 | | 4.91 | VW | 4.955 | VW | | |
| 4.81 | | | | | | 4.81 | VW |
| 4.75 | W | | | 4.73 | MW | | |
| 4.29 | M | | | 4.25 | M | | |
| 4.17 | M | 4.16 | M | 4.16 | M | 4.15 | M |
| 3.98 | VS | 3.97 | VS | 3.97 | VS | 3.97 | VS |
| 3.54 | W | 3.53 | W | 3.86 | MW | 3.51 | MW |
| | | | | 3.51 | M | | |
| 3.42 | W | | | 3.46 | MW | | |
| 3.33 | MW | | | 3.29 | M | 3.31 | MW |
| 3.21 | | 3.325 | MW | 3.18 | W | | |
| | | 3.21 | VW | | | | |
| 3.12 | W | 3.10 | W | 3.095 | MW | 3.095 | MW |
| 3.03 | M | 3.03 | MW | 3.01 | M | 3.015 | M |
| 2.90 | M | 2.93 | W | 2.895 | VW | 2.93 | W |
| 2.74 | VW | | | | | 2.76 | VW |
| 2.69 | W | 2.69 | VW | 2.68 | MW | 2.69 | W |
| 2.58 | W | 2.69 | VW | | | 2.57 | VW |
| 2.49 | W | 2.48 | VW | 2.495 | VW | 2.485 | VW |
| 2.41 | VW | 2.40 | VW | 2.43 | VW | 2.40 | VW |
| 2.34 | W | 2.34 | VW | | | 2.34 | VW |
| 2.25 | VW | 2.25 | VW | | | 2.25 | VW |
| 2.21 | | 2.21 | VW | 2.21 | VW | | |
| 2.17 | | 2.17 | VW | | | 2.16 | VW |
| 2.13 | | 2.13 | VW | | | | |
| 2.08 | W | 2.08 | VW | 2.08 | MW | 2.08 | W |
| 2.045 | | 2.05 | VW | | | 2.045 | VW |
| 2.03 | VW | 2.03 | VW | 2.03 | W | 2.03 | VW |
| 1.99 | | 1.99 | VW | | | | |

TABLE 3

| Ca Beta | | La Beta | | Mn Beta | |
|---|---|---|---|---|---|
| d (A.) | Int. | d (A.) | Int. | d (A.) | Int. |
| 11.4 | S | 11.5 | S | 11.3 | S |
| 7.4 | VW | | | 7.5 | W |
| 7.22 | | 7.22 | W | | |
| 6.88 | | 6.88 | W | | |
| 6.59 | W | 6.59 | MW | 6.57 | MW |
| 6.10 | VW | | | | |
| 6.04 | | 6.04 | W | 6.02 | W |
| 4.86 | | 4.86 | VW | 4.83 | VW |
| 4.35 | | | | 4.35 | M |
| 4.15 | M | 4.16 | W | | |
| 3.97 | VS | 3.97 | VS | 3.97 | VS |
| 3.51 | MW | 3.52 | M | 3.52 | MW |
| 3.31 | MW | 3.31 | MW | 3.31 | MW |
| 3.23 | | | | 3.23 | VW |
| 3.09 | MW | | | 3.10 | MW |
| 3.02 | M | 3.01 | M | 3.01 | M |
| 2.93 | W | | | 2.93 | W |
| 2.90 | W | 2.90 | MW | | |
| 2.69 | W | | | 2.69 | W |
| 2.64 | | 2.64 | W | | |
| 2.56 | VW | | | 2.59 | W |
| 2.48 | VW | 2.49 | VW | 2.47 | VW |
| 2.41 | | 2.41 | VW | 2.40 | VW |
| 2.34 | VW | 2.34 | W | 2.34 | VW |
| 2.20 | VW | 2.23 | VW | 2.19 | VW |
| 2.17 | | 2.17 | VW | | |
| 2.08 | W | 2.07 | W | 2.09 | W |
| 2.03 | VW | 2.03 | VW | 2.03 | VW |

The more significant d values for exchanged beta zeolite are given in Table 4.

Table 4.—d Values of Reflections in Exchanged Beta 11.4±0.2
7.4±0.2
6.7±0.2
4.25±0.1
3.97±0.1
3.0±0.1
2.2±0.1

Highly active hydrocarbon conversion catalysts may be obtained by treating the above-described crystalline zeolite beta with a fluid medium containing a hydrogen ion or ion capable of conversion to a hydrogen ion in an amount sufficient to impart catalytic properties thereto. The catalysts so obtained possess a wide spectrum in magnitude of catalytic activity; can be used in extremely small concentrations; and permit certain hydrocarbon conversion processes to be carried out under practicable and controllable rates at temperatures much lower than those previously employed. In the catalytic cracking of hydrocarbon oils into hydrocarbon products of lower molecular weight, the reaction rates per unit volume of catalyst that are obtainable by (hydrogen treated) zeolite beta may vary up to several fold the rates achieved with siliceous catalysts heretofore proposed. These catalysts furthermore can be used directly as the sole catalytic constituent or as intermediates in the preparation of further modified contact masses having catalytic properties. Such modified contact masses may comprise the treated crystalline zeolite per se or a dispersed mixture of the treated aluminosilicates with a predetermined amount of a low activity and/or catalytically active material which serves as a binder or matrix for the catalyst constituent.

The high activity catalysts contemplated are obtained by contacting zeolite beta with a fluid medium containing hydrogen ions or ions capable of conversion thereto, washing the treated material free of soluble anions, and thereafter drying and thermally activating the product by heating at temperatures ranging from about 400° F. to 1700° F. or higher for a period between about one and forty-eight hours. The resulting product is an activated aluminosilicate, strongly acidic in character, which contains less than about 10 percent by weight metal and substantially corresponds to the hydrogen form of the zeolite beta precursor material. When subsequently used alone or combined in a state of particle size of less than about 40 microns, dispersed or otherwise intimately admixed with a suitable matrix, such as an inorganic oxide gel, the resulting product has been found to be active as a catalyst for hydrocarbon conversion.

The compositions resulting from treatment of zeolite beta with fluid media containing hydrogen ions, ammonium ions or complex ammonium ions and metal ions, or mixtures thereof may be employed as catalysts in a wide variety of hydrocarbon conversion processes including isomerization, disproportionation, hydration of olefins, amination of olefins, oxidation, dehydrogenation, dehydration of alcohols, desulfurization, hydrogenation, reforming, hydrocracking, polymerization and the like. The catalysts are exceptionally stable and are particularly useful in such of the above and related processes carried out at temperatures ranging from ambient temperatures of 70° F. up to 1000° F., including such processes in which the catalyst is periodically regenerated by burning off combustible deposits. Because of their high catalytic activities, the catalysts are especially useful for effecting various hydrocarbon conversion processes such as alkylation, for example, at relatively low temperatures with small amounts of catalyst, thus providing a minimum of undesirable side reactions and operating costs.

The catalysts may be used as such or as intermediates in the preparation of further modified contact masses comprising low activity or catalytically active materials which serve as a support or matrix for the aluminosilicate. The catalyst may be used in powdered, granular or molded state formed into spheres or pellets of finely divided particles having a particle size of 2 to 500 mesh. In cases where the catalyst is molded, such as by extrusion, the aluminosilicate may be extruded before drying, or dried or partially dried and then extruded. The catalyst product is then preferably precalcined in an inert atmosphere or may undergo calcination initially during use in the conversion process. Generally, the composition is dried between 150° F. and 600° F. and thereafter calcined in air or steam or an inert atmosphere of nitrogen, hydrogen, helium, flue gas or other inert gas at temperatures ranging from 400° F. to 1700° F. for periods of time ranging from one to forty-eight hours or more. This heating step is known as thermal activation of the catalyst.

The catalyst of this invention may be prepared in any desired physical form. Preferably, it is used in the form of small fragments of a size best suited for operation under the specific conditions existing. Thus, the catalyst may be in the form of finely divided powder or may be in the form of pellets of 1/16" to 1/8" size, for example, obtained upon pelleting, casting, or extruding in accordance with well known techniques.

The following examples will serve to illustrate the product and method of the present invention without limiting the same:

Example 1

2.3 g. of sodium aluminate were dissolved in 43.4 ml. water. This solution, hot, was added to 70 ml. of hot solution of 2.7 N tetraethylammonium hydroxide plus 18.6 g. silica gel (Davison) with rapid stirring which was continued for fifteen minutes. The mixture was held at 78° C. for about forty-two days. This process yielded crystals which were separated from the mother liquor by centrifugation. The wet solids, after decantation and subsequent water washing were dried at 100° C. after which the crysatls showed the X-ray pattern of Table 2. The crystals then showed the properties:

| Composition (dehydrated basis): | Mol percent |
|---|---|
| $Na_2O$ | 4.5 |
| $Al_2O_3$ | 6.4 |
| $SiO_2$ | 89.0 |

| Sorption properties: | Wt. percent sorbed |
|---|---|
| Cyclohexane | 14.6 |
| n-Hexane | 13.8 |
| $H_2O$ | 20.1 |

The fact that the adsorption capacity for cyclohexane and n-hexane are relatively low in this case was found later to be due to incomplete crystallization in this particular case.

Example 2

A reaction mixture having the following composition, exclusive of water, was prepared:

| | Mol percent |
|---|---|
| $Na_2O$ | 0.3 |
| $Al_2O_3$ | 0.9 |
| $[(C_2H_5)_4N]_2O$ | 9.5 |
| $SiO_2$ | 89.2 |

0.8 g. aluminum turnings were dissolved in 116.3 ml. 2.65 N tetraethylammonium hydroxide and served as the alumina source. Silica and $Na_2O$ were supplied as 243 ml. of silica sol (30% $SiO_2$) known as Ludox LS. The reaction mixture was stirred during mixing of the reagents, but thereafter the mixture was not stirred. After sixty days at 100° C. a crystalline product was obtained by centrifuging the supernatant liquor in the reaction flask. Its powder picture was essentially identical to that of Example 1.

Its composition in mol percent after calcination with air at 550° C. was 0.7% $Na_2O$, 1.3% $Al_2O_3$ and 98.0 mol percent $SiO_2$. Thus the silica/alumina is almost 96/1.

Its absorption properties (calcined as above) were (in g. absorbed 100 g. sample) 19.4 cyclohexane, 16.6 n-hexane and 18.1 water.

Example 3

The gelatinous material left in the flask in the above example was air-dried at room temperature. A portion of this material was added with 50 ml. of 2.65 N tetraethylammonium hydroxide (TEAOH) to an autoclave and treated for three days at 150° C. The liquor obtained was centrifuged, yielding crystals which were washed and air dried. X-ray examination of the product showed the same crystalline structure as in the first two examples.

Example 4

The calcined product from Example 2 (1.5 cc.) was tested as a hydrocarbon conversion catalyst by passing a helium stream saturated at 73° F. with n-hexane over the catalyst at 700° F. and 0.4 LHSV. At the end of five minutes, chromatographic analysis of the product sample showed the catalyst to have a rate constant for the cracking of n-hexane 900 times as great as that of a standard silica-alumina cracking catalyst.

Example 5

A 6.6 g. sample of the product of Example 2 was base exchanged with a solution of 1.5 lb. $RECl_3 \cdot 6H_2O$ where RE is a rare earth and 0.6 lb. $NH_4Cl$ dissolved in 30 lbs. $H_2O$ continuously for three days. The rare earth-acid aluminosilicate resulting from this exchange was also tested for its hydrocarbon conversion activity in the same manner used in Example 4 except that the temperature of the test was 600° F. In this case the relative rate constant (alpha) was 6400 times as great as the standard silica-alumina catalyst.

Example 6

A 1.63 g. sample of $NaAlO_2$ was dissolved in 30.7 ml. $H_2O$ and added to a mixture of 13.1 g. silica gel (Davison) and 49.5 ml. of 2.74 N tetraethylammonium hydroxide (TEAOH). The reaction mixture was charged to an autoclave and heated to 150° C. at which temperature it was held for six days. The crystalline product which formed had the following composition: $Na_2O$—0.8%, $Al_2O$—3.25% and $SiO_2$—96.0 mol percent, and X-ray examination showed the same crystalline pattern as in Examples 1 and 2. After calcination the adsorption capacity of the crystalline product was 17.2 g. cyclohexane/100 g. beta and 18.3 g. $H_2O$/100 g. beta.

Example 7

An 11.6 g. sample of $NaAlO_2$ was added to 116 ml. 2.58 N tetraethylammonium hydroxide (TEAOH). To this was added 290.7 g. silica sol (Ludox LS). A thick, smooth gel was formed immediately. This was placed into an autoclave, heated to 150° C. for six days at which time a large amount of crystalline material had formed. This was filtered and air dried. The X-ray pattern was again that of the beta-zeolite. The composition on a calcined sample was (mol percent): $Na_2O$—2.9%, $Al_2O_3$—3.1% and $SiO_2$—94.0%.

Example 8

A 50 g. sample of the dried product from Example 7 was exchanged continuously for forty-eight hours with a 2 percent solution of $NH_4Cl$. After washing free of excess chloride ions the catalyst was dried, then calcined for three hours at 1000° F. The resulting material is an acid beta-aluminosilicate having only 0.07 percent Na content. This was tested at 600° F. by the hexane cracking test already described. Its relative rate constant for hexane cracking was 20,000.

Example 9

Another 50 g. portion of the dried product from Example 7 was exchanged continuously for forty-eight hours with a 2 percent solution of $RECl_3 \cdot 6H_2O$. After washing, drying and air calcining the product contained 0.08 percent Na, 3.74 percent $RE_2O$, 5.2 percent $Al_2O_3$ and 90 percent $SiO_2$. This was also tested at 600° F. as a hydrocarbon conversion catalyst by use of the hexane cracking test already described. Its relative reaction rate constant was 19,000.

It is to be understood that the above description is merely illustrative of preferred embodiments of the invention of which many variations may be made by those skilled in the art within the scope of the following claims without departing from the spirit thereof.

What is claimed is:

1. A crystalline synthetic zeolite material having the calculated composition:

$$[XNa(1.0 \pm 0.1 - X)TEA]AlO_2 \cdot YSiO_2 \cdot WH_2O$$

wherein X is less than 1, Y is greater than 5 but less than 100, W is up to about 4, and TEA represents tetraethylammonium ion, said material being characterized by an X-ray powder diffraction pattern essentially the same as that shown in Table 4.

2. A crystalline synthetic catalyst material having the composition:

$$\left[\frac{X}{n}M(1 \pm 0.1 - X)H\right]AlO_2 \cdot YSiO_2 \cdot WH_2O$$

where X is less than 1, Y is greater than 5 but less than 100, W is up to about 4, M is a metal, and n is the valence of M, said material being characterized by an X-ray powder diffraction pattern essentially the same as that shown in Table 4.

3. A crystalline synthetic catalyst material having the composition:

$$\left[\frac{X}{n}M(1 \pm 0.1 - X)H\right]AlO_2 \cdot YSiO_2$$

where X is less than 1, Y is greater than 5 but less than 100, M is a metal, and n is the valence of M, said material being characterized by an X-ray powder diffraction pattern essentially the same as that shown in Table 4.

4. A crystalline synthetic material having the composition:

$$\left[\frac{X}{n}M(1 \pm 0.1 - X)TEA\right]AlO_2 \cdot YSiO_2 \cdot WH_2O$$

where X is less than 1, Y is greater than 5 but less than 100, W is up to about 4, TEA represents tetraethylammonium ion, M is a metal, and n is the valence of M, said material being characterized by an X-ray powder diffraction pattern essentially the same as that shown in Table 4.

5. A method for synthesizing a crystalline material which comprises preparing a reaction mixture whose composition expressed in terms of mol ratios falls within the following ranges:

$SiO_2/Al_2O_3$—from about 10 to about 200
$Na_2O$/tetraethylammonium hydroxide—from about 0.0 to about 0.1
Tetraethylammonium hydroxide/$SiO_2$—from about 0.1 to about 1.0
$H_2O$/tetraethylammonium hydroxide—from about 20 to about 75 and maintaining said mixture at a temperature within the range of 75° C. to 20° C. until said crystalline material is formed.

6. A method for synthesizing a crystalline material which comprises preparing a reaction mixture whose composition expressed in terms of mol ratios falls within the following ranges:

$SiO_2/Al_2O_3$—from about 10 to about 150
$Na_2O$/tetraethylammonium hydroxide—from about 0.0 to about 0.1
Tetraethylammonium hydroxide/$SiO_2$—from about 0.1 to about 1.0
$H_2O$/tetraethylammonium hydroxide—from about 20 to about 75 and maintaining said mixture at a temperature within the range of 75° C. to 150° C. until said crystalline material is formed.

7. A method in accordance with claim 5 followed by separating the crystals from the mother liquor, and subjecting the separated crystals to a calcining treatment by heating at a temperature in the approximate range of 400–1700° F.

8. A method in accordance with claim 5, followed by separating the crystals from the mother liquor and subjecting the crystals to ion exchange with a metal selected from the group consisting of the metals of Groups 1a, 2a, 3a, 3b, 4b, and 8 of the periodic classification of the elements.

9. A method for synthesizing a crystalline aluminosilicate in accordance with claim 7 followed by subjecting the crystals to ion exchange with a metal selected from the group consisting of the metals of Groups 1a, 2a, 3a, 3b, 4b, 5b, 6b, 7b and 8 of the periodic classification of the metals.

10. A method in accordance with claim 7 followed by depositing on the surface of the crystals a metal selected from the group consisting of metals of Groups, 5b, 6b and 8 of the periodic classification of the metals.

11. A method for synthesizing a crystalline aluminosilicate zeolite which comprises reacting sodium aluminate, silica and tetraethylammonium hydroxide, the resulting reaction mixture having a composition expressed in terms of mol ratios within the following ranges:

$SiO_2/Al_2O_3$—from about 10 to about 200
$Na_2O$/tetraethylammonium hydroxide—from about 0.0 to about 0.1
Tetraethylammonium hydroxide/$SiO_2$—from about 0.1 to about 1.0
$H_2O$/tetraethylammonium hydroxide—from about 20 to about 75 maintaining said mixture at a temperature within the approximate range of about 75° C. to 200° C. until crystals of said zeolite are formed, separating the crystals from the mother liquor and subjecting the separated crystals to an activation treatment by heating at a temperature in the approximate range of 400–1700° F.

12. A method for synthesizing a crystalline aluminosilicate zeolite which comprises reacting silica, tetraethylammonium aluminate and aqueous tetraethylammonium hydroxide, the resulting reaction mixture having a composition expressed in terms of mol ratios within the following ranges:

$SiO_2/Al_2O_3$—from about 10 to about 200
$Na_2O$/tetraethylammonium hydroxide—from about 0.0 to about 0.1
Tetraethylammonium hydroxide/$SiO_2$—from about 0.1 to about 1.0
$H_2O$/tetraethylammonium hydroxide—from about 20 to about 75 maintaining said mixture at a temperature within the approximate range of about 75° C. to 200° C. until crystals of said zeolite are formed, separating the crystals from the mother liquor and subjecting the separated crystals to an activation treatment by heating at a temperature in the approximate range of 400–1700° F.

13. A method for preparing a catalyst composition which comprises treating with an aqueous fluid medium containing a source of positive ions selected from the group consisting of acids and ammonium compounds, a crystalline synthetic aluminosilicate having the formula:

$$[XNa(1.0\pm0.1-X)TEA]AlO_2\cdot YSiO_2\cdot WH_2O$$

where X is less than 1, Y is greater than 5 but less than 100, W is up to about 4, and TEA represents tetraethylammonium ion; carrying out such treatment for a period of time sufficient to provide a hydrogen aluminosilicate composition, washing the treated material free of soluble anions, and thereafter drying and thermally activating the product by heating at temperatures ranging from about 400–1700° F.

14. A method for preparing a catalyst composition which comprises treating with an aqueous fluid medium containing a source of positive ions selected from the group consisting of rare earth metals and metals of Groups 2a and 3a of the Periodic Table, a crystalline synthetic aluminosilicate having the formula:

$$[XNa(1.0\pm0.1-X)TEA]AlO_2\cdot YSiO_2\cdot WH_2O$$

where X is less than 1, Y is greater than 5 but less than 100, W is up to about 4, and TEA represents tetraethylammonium ion; carrying out such treatment for a period of time sufficient to provide a hydrogen aluminosilicate composition, washing the treated material free of soluble anions, and thereafter drying and thermally activating the product by heating at temperatures ranging from about 400–1700° F.

*15. In a process for conducting in the presence of a solid porous catalyst a hydrocarbon conversion reaction characterized by a heat of reaction not less than zero, the improvement which comprises contacting charge hydrocarbons for said reaction at conversion conditions with a crystalline aluminosilicate catalyst at least partially in the hydrogen form resulting from treatment of the zeolite defined in claim 2 with a fluid medium containing ions selected from the group consisting of hydrogen ions and ammonium ions.*

*16. The process of claim 15 wherein said fluid treating medium also contains metal cations.*

*17. The process of claim 15 wherein at least a portion of the ammonioum ions in said treating medium are complex ammonium ions.*

References Cited

The following references, cited by the Examiner, are of record in the patented file of this patent or the original patent.

UNITED STATES PATENTS

| | | | |
|---|---|---|---|
| 3,140,251 | 7/1964 | Plank et al. | 208—120 |
| 3,140,253 | 7/1964 | Plank et al. | 208—120 |

DELBERT E. GANTZ, Primary Examiner

U.S. Cl. X.R.

252—455 Z

UNITED STATES PATENT AND TRADEMARK OFFICE

CERTIFICATE OF CORRECTION

PATENT NO. : Re. 28,341

DATED : February 18, 1975

INVENTOR(S) : ROBERT L. WADLINGER, ET AL.

It is certified that error appears in the above-identified patent and that said Letters Patent are hereby corrected as shown below:

Column 3, line 43, "n" at end of formula should be deleted.

Column 11, Claim 8, line 5, after "4b" insert -- 7b --.

Signed and Sealed this twenty-sixth Day of August 1975

[SEAL]

Attest:

RUTH C. MASON
*Attesting Officer*

C. MARSHALL DANN
*Commissioner of Patents and Trademarks*